F. LAIST.
PROCESS OF EXTRACTING COPPER FROM ORE.
APPLICATION FILED DEC. 16, 1912.
1,076,833. Patented Oct. 28, 1913.
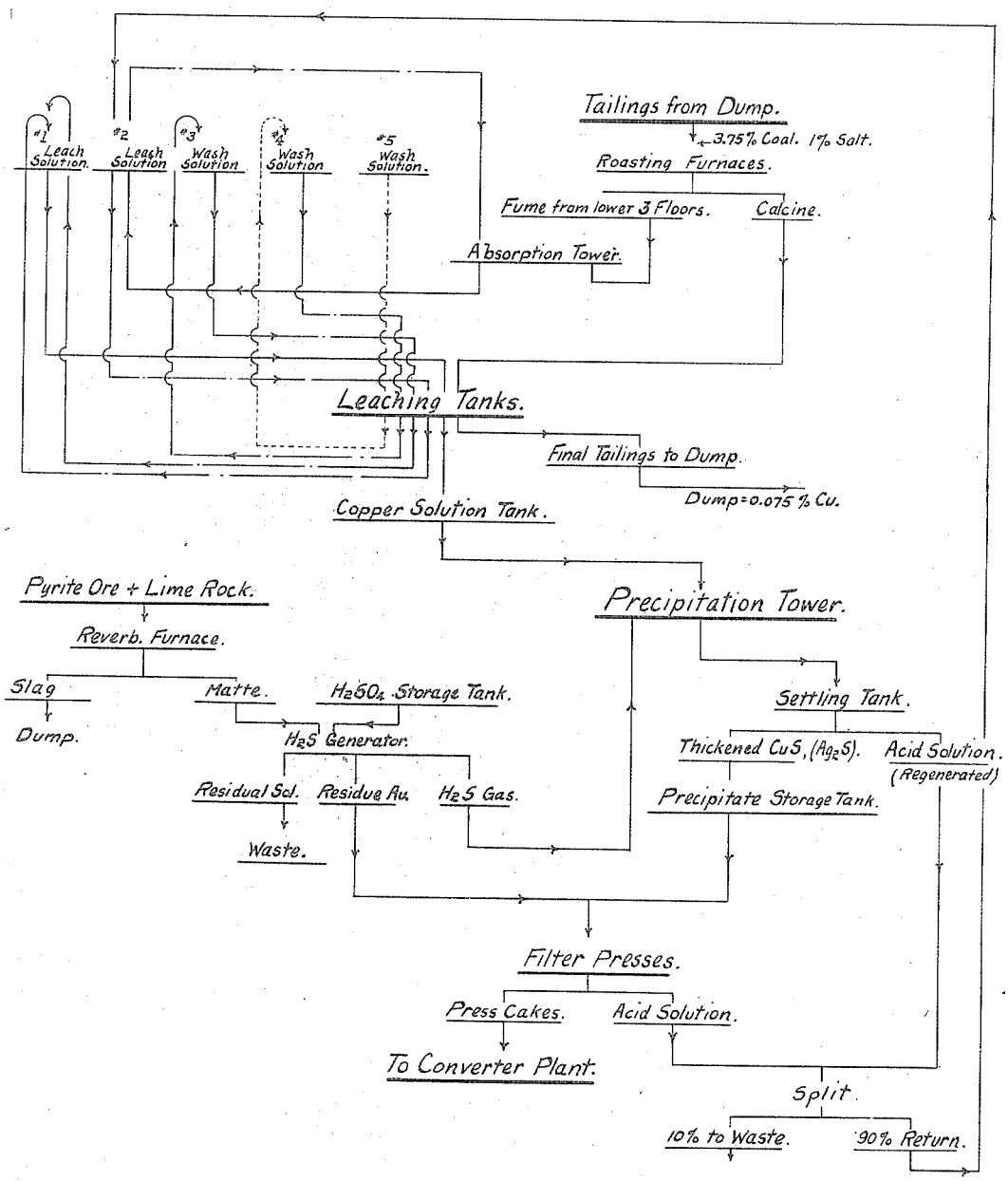
WITNESSES:
INVENTOR.
Frederick Laist.
BY
ATTORNEY.

UNITED STATES PATENT OFFICE.

FREDERICK LAIST, OF ANACONDA, MONTANA.

PROCESS OF EXTRACTING COPPER FROM ORE.

1,076,833.     Specification of Letters Patent.     Patented Oct. 28, 1913.

Application filed December 16, 1912. Serial No. 737,114.

*To all whom it may concern:*

Be it known that I, FREDERICK LAIST, citizen of the United States, residing at Anaconda, in the county of Deerlodge and State of Montana, have invented certain new and useful Improvements in Processes of Extracting Copper from Ore, of which the following is a full, clear, and exact description, reference being had to the accompanying drawings, forming a part hereof.

The present invention is specifically directed to the recovery of copper from low grade ores or tailings in which the metal may be in the form of oxid, carbonate, silicate or sulfid, or in fact in any form capable of dissolving in a liquid from which it may be precipitated by the action of sulfureted hydrogen. In the present embodiment of my invention the process likewise contemplates the recovery of any silver which may be associated with the copper, the object of the invention being to attain the recovery of these values with a minimum waste of both metal and of the solutions which enter into the chemical reactions inherent in the process.

While no specific form of apparatus or combination of apparatus is necessarily identified with my improved process it will be convenient to illustrate diagrammatically at least the relation of the component parts comprising a plant in which the several reactions may be carried out. Such a diagram is illustrated in the accompanying drawing.

If the ore is in a form other than the sulfid no special preliminary chemical treatment thereof is necessary as it can be attacked by a proper leaching solvent from which the metal may subsequently be precipitated by sulfureted hydrogen. Inasmuch as the sulfid however, requires special preliminary treatment, particularly where silver is associated with the copper, it is desirable that the details of the process be set forth on the assumption that silver is present.

In detail the invention may be described as follows, reference being had in an incidental way to the diagram illustrated in the drawing.

The low grade ore or tailings (reduced to a size convenient for roasting) is first subjected to a preliminary roast for the oxidation and partial elimination of the sulfur content, such preliminary roast being of an oxidizing character and conducted preferably in a multiple hearth McDougal roasting furnace, the details of which form the subject-matter of an independent application for patent. For convenience we shall assume that the furnace comprises six superposed hearths in the three upper ones of which the oxidizing roast is carried on. As a result of this oxidizing (or sulfating) roast the copper sulfid is converted into a probable mixture of copper oxid and copper sulfate, part of the silver sulfid being converted into a sulfate of silver, and the iron (generally present) into a mixture of ferrous oxid and ferrous sulfate. The material thus subjected to an oxidizing roast in the three upper hearths of the furnace drops down and traverses the three bottom hearths, where it is subjected to a chloridizing roast by the addition thereto of a sufficient quantity of common salt, (say one per cent, which however, is varied according to the character of the charge). In this chloridizing action all the silver and some of the copper is converted into the chlorid, the chlorid of iron which is likewise formed being broken up into the oxid by the heat, and oxygen present. At this stage of the process the reactions are probably as follows:

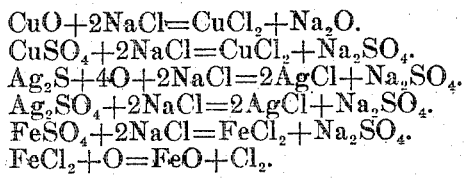

$$CuO + 2NaCl = CuCl_2 + Na_2O.$$
$$CuSO_4 + 2NaCl = CuCl_2 + Na_2SO_4.$$
$$Ag_2S + 4O + 2NaCl = 2AgCl + Na_2SO_4.$$
$$Ag_2SO_4 + 2NaCl = 2AgCl + Na_2SO_4.$$
$$FeSO_4 + 2NaCl = FeCl_2 + Na_2SO_4.$$
$$FeCl_2 + O = FeO + Cl_2.$$

Any unconverted copper sulfate is discharged from the furnace with the silver chlorid and copper chlorid, and with any iron oxid present in the chloridized charge. In the chloridizing roasting action some of the copper passes off as fumes of copper chlorid together with any fumes of hydrochloric acid which may be produced as a result of the generation of nascent chlorin gas due to the decomposition of the salt. Such fumes are drafted from the lower set of chloridizing hearths by any form of exhauster and allowed to traverse an absorption tower of any approved pattern where they are absorbed by the water in the tower and returned to the leaching solution employed for dissolving the roasted and chloridized product. It may be stated in passing that to successfully carry on the chloridizing roast a sufficient quantity of air should be admitted to the lower hearths of the furnace, for that purpose.

Upon the conclusion of the combined sulfating (oxidizing) and chloridizing roast, the material (calcine) is discharged from the bottom hearth of the furnace and conveyed to a leaching tank or tanks into which is conducted at the necessary rate of speed, a leaching solution composed of water with about five per cent. of sulfuric acid ($H_2SO_4$) and ten per cent. of common salt (NaCl) (the solution containing incidentally as presently to be seen, certain amounts of iron and aluminum sulfates and chlorids as impurities due to the action of the wash solutions on the ore charge and the absorption of similar impurities by the water in the absorption tower). The leaching solution dissolves the several metallic compounds present in the charge deposited in the leaching tank, thereby bringing about a mixed acid solution of copper chlorid, copper sulfate, silver chlorid, (and iron and aluminum sulfates and chlorids as impurities). The solution of the combined metals is then drained off or conducted from the leaching tank into a precipitating vat or tower into which is conducted sulfureted hydrogen gas ($H_2S$) which precipitates the metals (copper and silver) as sulfids as indicated by the following reactions—

$$CuCl_2 + H_2S = CuS + 2HCl.$$
$$CuSO_4 + H_2S = CuS + H_2SO_4.$$
$$2AgCl + H_2S = Ag_2S + 2HCl.$$

The sulfureted hydrogen does not of course, precipitate the iron or aluminum, these salts remaining permanent components of the solution. From the precipitating vat or tower the mixture of precipitates and solution is conducted to a settling tank from which the thickened precipitate (CuS and $Ag_2S$) is conducted to a precipitate storage tank, the acid solution being conveyed to one of the leach solution containers and used for leaching fresh charges of ore. From the last reactions it will be seen that the acid ($H_2SO_4$, HCl) is regenerated and is thus used over again; but to prevent the building up of undue quantities of iron and aluminum compounds which remain as permanent component parts of the liquid, the regenerated solution is "split" at the end of each cycle or operation, and a portion of the liquid is discarded, approximately ten per cent. being allowed to go to waste, and ninety per cent. is returned for leaching fresh charges of ore. From the precipitate storage tank the precipitates of copper sulfid and silver sulfid are conducted to a filter press, the press cakes being sent to the converter plant or smelter. The sulfureted hydrogen as a precipitant has the advantage over the majority of others in that it introduces no undesirable impurities into the solution. It has the advantage over electrolytic precipitation in that the plant outlay is much less, and its action is in no wise affected by ordinary impurities dissolved from the ore by the acid solvent.

In carrying on my process I generate the sulfureted hydrogen by treating iron matte or iron-copper matte with dilute sulfuric acid. The matte is made by smelting pyrite or pyrrhotite ore, preferably containing gold and silver values, in a reverberatory or blast furnace with the addition of necessary fluxes, thus forming a slag and a matte. This matte is chiefly sulfid of iron (FeS) and is readily decomposed by dilute sulfuric acid with the formation of sulfureted hydrogen and iron sulfate, thus:—

$$FeS + H_2SO_4 = FeSO_4 + H_2S.$$

In practice the matte drawn from the furnace together with the sulfuric acid is conducted to a $H_2S$ generator whence the gas is conducted to the precipitation tower, the residual solution ($FeSO_4$) being allowed to go to waste. The gold (silver and copper) values remain in the generator residue and are collected in the filter press and sent to the smelter together with the precipitated copper and silver sulfids.

Referring to the drawing, it will be noted that there are indicated #1 leach solution, #2 leach solution, and numbers 3, 4 and 5 wash solutions. The last wash solution (water) is conducted through the leaching tank (or tanks) to wash the sand remaining in the tank after the metallic salts have been dissolved out. The wash solution #5 after passing through the leaching tank is discharged into wash solution #4. From the latter the solution again passes through the leaching tank and discharges into wash solution #3. From this the solution passes through the leaching tank and discharges into leach solution #1. Likewise from leach solution #2 the liquid passes through the leaching tank and discharges into leaching solution #1. The regenerated solution or acid solvent is discharged into leach solution #2, the solution from leach solution #1 being availed of to dissolve the main metal content of the leaching tank whence the dissolved metals are conducted to the copper solution tank and thence to the precipitation tower as already described. The weakest wash solution is #5, this gathering strength each time the current passes through the leaching tank (for purposes of washing the sands of undrained metallic salts), wash solution #3 being the strongest in salts. This progressive increase in the strength of the wash solutions prevents an undesirable weakening of the leaching solution with which the wash solutions mingle. The drawing likewise shows the liquid from the absorption tower in which are absorbed the fumes of the chloridizing hearths of the roasting furnace, as discharging into leaching solution #2. The flow of the liquids as here shown need not of course be strictly adhered to, any other method for conserving the desired strength of the leaching solution falling within the contemplation of my invention.

The several instrumentalities employed in my process, such as tanks, towers, filter presses, precipitation towers, roasting furnaces, gas generators, and the like may be varied at will, such variation in no wise affecting the process so long as substantially the succession of steps here outlined are adhered to.

Having described my invention, what I claim is:—

1. In the recovery of metallic copper and silver from a sulfid ore of said metals, the process of subjecting a charge of the ore to a preliminary oxidizing roast, then to a subsequent roast in the presence of salt, subjecting the resulting calcine to the action of water containing suitable proportions of sulfuric acid and salt thereby leaching the metallic salts from the ore, subjecting the resulting solution to the action of sulfureted hydrogen whereby the metals are precipitated as sulfids, and at the same time regenerating the leaching solution, and splitting the latter at the conclusion of each cycle of operations, for the purpose set forth.

2. In the recovery of metallic copper and silver from a sulfid ore of said metals, the process of subjecting a charge of the ore to a preliminary oxidizing roast, then to a subsequent roast in the presence of salt, subjecting the resulting calcine to the action of water containing suitable proportions of sulfuric acid and salt, thereby leaching the metallic salts from the ore, subjecting the resulting solution to the action of sulfureted hydrogen whereby the metals are precipitated as sulfids and at the same time regenerating the leaching solution, and returning the major portion of the regenerated leaching solution for treating fresh charges of ore.

In testimony whereof I affix my signature, in presence of two witnesses.

FREDERICK LAIST.

Witnesses:
WARREN JENNEY,
CLAUDE B. MEEKER.